United States Patent [19]

Gdovin

[11] 4,060,835
[45] Nov. 29, 1977

[54] VIEWING HEAD

[75] Inventor: David Paul Gdovin, Vestal, N.Y.

[73] Assignee: The Singer Company, Binghamton, N.Y.

[21] Appl. No.: 654,106

[22] Filed: Feb. 2, 1976

[51] Int. Cl.$^2$ .................... H04N 5/74; H04N 5/645
[52] U.S. Cl. ................... 358/238; 358/104; 358/254
[58] Field of Search ............ 178/7.8, 7.83, 7.84, 178/7.88, 7.91; 350/174; 358/87, 104, 238, 254

[56] References Cited

U.S. PATENT DOCUMENTS

| 3,036,154 | 5/1962 | Harman | 178/7.91 |
| 3,659,920 | 8/1970 | McGlasson | 350/174 |

Primary Examiner—Robert L. Griffin
Assistant Examiner—Edward L. Coles
Attorney, Agent, or Firm—Ronald Reichman; James C. Kesterson

[57] ABSTRACT

The invention of this disclosure is a viewing head that packages a spherical mirror, beamsplitter, and cathode ray tube (CRT) in an enclosed container. The process of assembling the viewing head will automatically maintain the spherical mirror, beamsplitter, and CRT in optical alignment, making a time-consuming alignment procedure unnecessary. Because the optical equipment is contained within an enclosed container, the optical equipment will not have to be cleaned as often.

10 Claims, 4 Drawing Figures

VIEWING HEAD

CROSS-REFERENCE TO RELATED APPLICATIONS

The subject matter of this invention is an improvement to the subject matter of U.S. Pat. No. 3,568,971 issued Mar. 9, 1971, in the name of Howard I. Jarmy and entitled Cathode Ray Tube Mounting, and U.S. Pat. No. 3,659,920 issued May 2, 1972, in the name of Frank William McGlasson and entitled Wide Angle Infinity Image Visual Display.

BACKGROUND OF THE INVENTION

1. Field of the Invention

This invention relates to optical systems and, more particularly, to systems that facilitate the alignment of optical devices.

2. Description of the Prior Art

The advancement of our civilization was and is dependent upon the ability of one generation of people to hand down to the next generation of people its knowledge and experiences. Most of the training which we receive in our lifetime is under real life conditions. For instance, an actual aeroplane is used to teach someone how to fly. An aeroplane is a complex, dangerous, and costly machine, making it highly impractical for a student pilot to receive all of his flight training in an actual aeroplane. To solve this problem, simulators have been developed to permit pilots to receive some of their flight training without leaving the ground. A simulator is a machine that duplicates, within reasonable limits, the environment, motions and malfunctions that a person would encounter while using the real machinery.

The actual equipment used in the cockpit of an aeroplane is sometimes the same equipment that is used in the cockpit of the simulator. This is done to create an environment that approximates the environment that exists in the real world. In an aircraft simulator, the cockpit of an aircraft is placed on a motion system that will move in response to the pilot's operation of the aircraft's controls, giving the pilot the sensation of motion without leaving the ground. A noise generator is also used so that the pilot will hear the same sounds that he hears while he is manipulating the controls of an actual aircraft. The pilot's visual senses must also be simulated to create a simulator that appears the same as an actual aircraft. In order for the simulator to be a useful training tool, when the pilot looks out of the window of the simulator's cockpit in order to make his final approach and land the simulated aircraft, the simulated runway must be in the same position and look the same as the actual runway does.

To create a visual impression of a scene in the real world, a person would produce a pictorial representation of that scene. An ordinary photographic picture will suffice when all the objects in the scene are standing still. However, when one of the objects in the scene is moving, a motion picture must be used in order to accurately reproduce the desired scene. The motion picture may be shown to an audience by transmitting the picture via a cathode ray tube (CRT). If the pilot looks at the picture appearing on the screen of the CRT, he will not see the same scene that he would see by looking out of the cockpit window. This is so because the objects that he is looking at are miles away and appear to be at infinity, i.e., the edge of a runway that he is flying towards. Therefore, when he moves his head left or right, up or down, the edge of the runway should not change relative to his head movements. If the pilot looked directly at the screen of the CRT, the edge of the runway would appear to move as the pilot moves his head.

An optical system has been designed to enable the pilot to see the picture appearing on the CRT screen at infinity. The aforementioned optical system comprises a spherical mirror of radius $r$ positioned directly in front of the pilot, a beamsplitter positioned between the pilot and the center of the spherical mirror at approximately a 45° angle, and a CRT located at a distance $r/2$ above the beamsplitter so that when the pilot looks out of the window of the cockpit, any point on the screen of the CRT will be on the image plane of the mirror, making the pilot believe that point is at infinity. In order for the pilot to believe that the objects appearing on the CRT screen are at infinity, the above optical equipment must be correctly positioned. The spherical mirror must be at a distance $r$ equal to its radius from the normal eye position of an observer, the beamsplitter should be between the observer and the spherical mirror and form approximately a 45° angle with the spherical mirror, and the CRT screen should be at a distance $r/2$ from the spherical mirror. A method employed by the prior art for aligning the beamsplitter and the spherical mirror consisted of clamping threaded stud plates to the spherical mirror and the beamsplitter and using an optical transit for sighting the trial and error adjustment of the bolts that are screwed into the stud plates. Thus, the alignment of the aforementioned optical system is a long and tedious process which may take several days to complete. The process of aligning the above optical system may prove to be very costly since there is a danger that the components of the optical system might be damaged in the process of aligning the sytem.

SUMMARY OF THE INVENTION

This invention overcomes the disadvantages of the prior art by providing a viewing head that packages the spherical mirror, beamsplitter, CRT combination in an enclosed box. The components of the viewing head are precisely machined so that the process of connecting the viewing head to the spherical mirror, beamsplitter and CRT will form an enclosed box containing the spherical mirror, beamsplitter and screen of the CRT in perfect optical alignment. The spherical mirror, beamsplitter, and CRT are arranged in the viewing head in such a manner that when the pilot views the image reflected by the spherical mirror, he will see all the information contained on the screen of the CRT. Several viewing heads may be connected together and then to the simulator cockpit to form a wide angle, infinity image, a visual display in which the student sitting in the cockpit has the same range of peripheral sight through his window as a pilot flying an actual aeroplane.

Viewing heads and combinations of viewing heads may be used in any type of visual system. For instance, they may also be used for train simulators, ship simulators, helicopter simulators, etc. The use of a viewing head reduces the number of times that the optical equipment contained therein must be cleaned, since an assembled viewing head has a relatively dust-free interior which limits the optical equipment's exposure to the outside environment. Frequent cleaning of optical systems may result in scratches being placed on the optitcal elements, causing the image produced by the optical system to be distorted. Sometimes an optical system is disassembled in the cleaning process creating a possibility that the components of the optical system may be damaged. The reassembly of the optical system would require another time-consuming alignment procedure, where there is an additional chance that the components of the optical system may be damaged. Thus, the use of a viewing head will increase the life of an optical system and reduce the time expended in aligning the optical system.

It is an object of this invention to provide a new and improved viewing head for containing optical systems.

It is a further object of this invention to provide a new and improved viewing head that facilitates the alignment of optical equipment.

Other objects and advantages of this invention will become apparent as the following description proceeds, which description should be considered together with the accompanying drawings.

DESCRIPTION OF A PREFERRED EMBODIMENT

Figure 1:
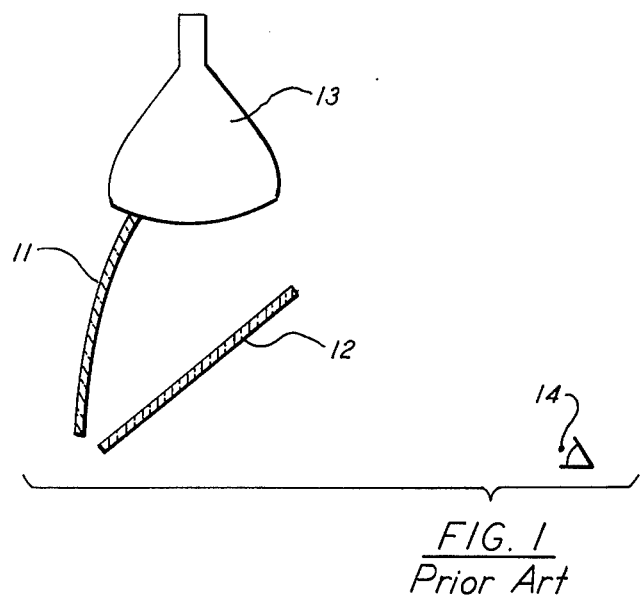
FIG. 1 is a side view of an arrangement of optical equipment used in the prior art.

Referring now to the drawings in detail and, more particularly, to FIG. 1 which is a side view of a spherical mirror, beamsplitter, cathode ray tube infinity image display device. Considering the display device comprising spherical mirror 11, beamsplitter 12 and cathode ray tube 13, it is well known in the art that making the radius of curvature of the face of the cathode ray tube one-half that of the spherical mirror and placing the display surface of the cathode ray tube at a distance from the spherical mirror equal to one-half the radius of the spherical mirror will result in an image focused at infinity. Thus, if the user of the aforementioned display positions his eye near point 14, he will receive the impression that he is viewing an actual scene through a window. The reason that the observer believes that he is looking through a window is that when he turns his head, he will no longer be looking at the display device and will be viewing a different scene. It is difficult to construct large spherical mirrors, large beamsplitters, and large cathode ray tubes. Therefore, a plurality of displays are attached to each other so that an observer will receive the impression that he is viewing a wide angle scene through a plurality of windows.

Figure 2:
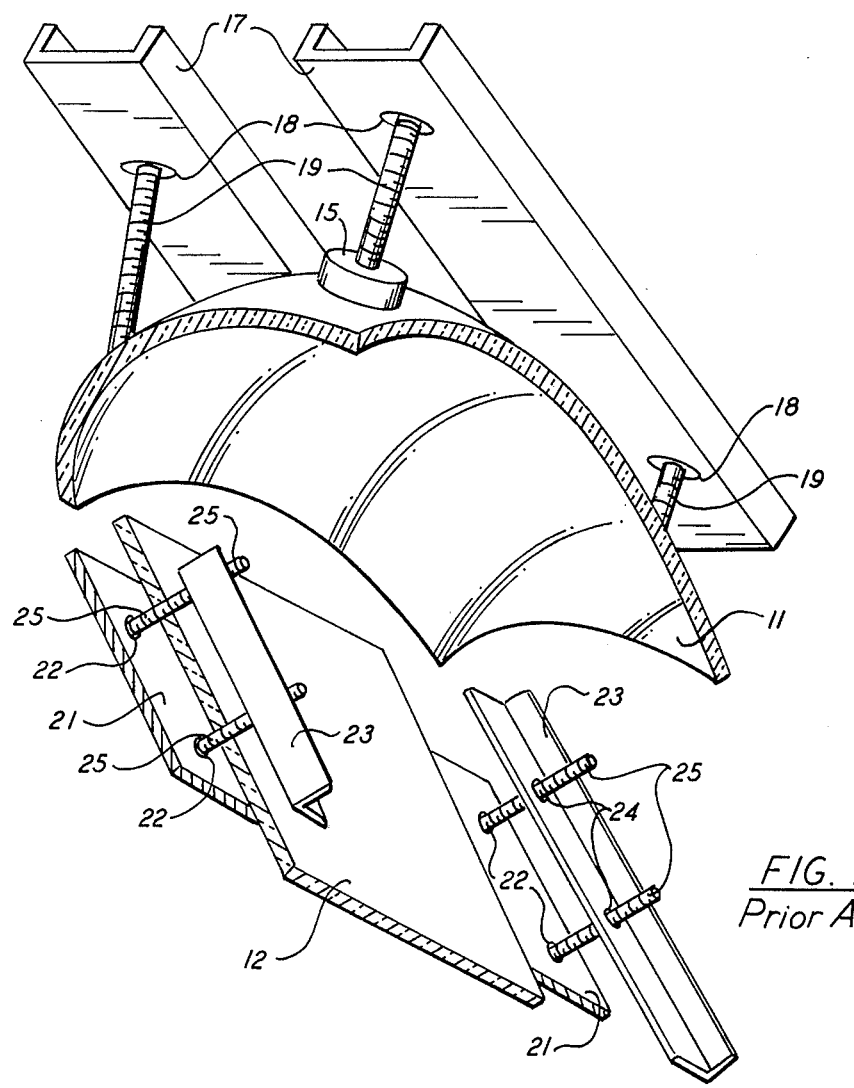
FIG. 2 is a perspective representation of the mechanical equipment used in the prior art to move a spherical mirror and beamsplitter.

FIG. 2 is a perspective representation of a mechanical system that was employed by the prior art to move a beamsplitter and a spherical mirror to align the optical equipment. Reference character 15 represents a plurality of threaded aluminum blocks that are bonded to the back surface of spherical mirror 11. Members 17 containing a multiplicity of holes 18 are positioned in back of spherical mirror 11. Members 17 are connected to some supporting structure (not shown) so that when a plurality of adjusting bolts 19 are passed through holes 18 and screwed into blocks 15, spherical mirror 11 will be in a fixed position.

Plates 21 which contain a multiplicity of holes 22 are bonded to one side of beamsplitter 12. Angle irons 23 which contain a multiplicity of threaded holes 24 are positioned above plate 21. Angle irons 23 are attached to some external structure (not shown), so that when a plurality of adjusting bolts 25 are placed through holes 22 and screwed into angle irons 23, through holes 24, beamsplitter 12 will be held in a fixed position.

Before CRT 13 is positioned above spherical mirror 11 and beamsplitter 12, spherical mirror 11 and beamsplitter 12 should be in perfect optical alignment. The person performing the optical alignment usually determines the proper positions of the spherical mirror and beamsplitter by using an optical transit that is positioned in front of the spherical mirror and the beamsplitter. By turning adjusting bolts 19 and 25, the spherical mirror and the beamsplitter can be correctly positioned. Adjusting bolts 19 and 25 must be turned very carefully since the turning of one adjusting bolt usually necessitates the turning of another adjusting bolt. Furthermore, the turning of the adjusting bolts may cause internal stresses within the spherical mirror and the beamsplitter, causing the spherical mirror and/or the beamsplitter to crack.

Figure 3:
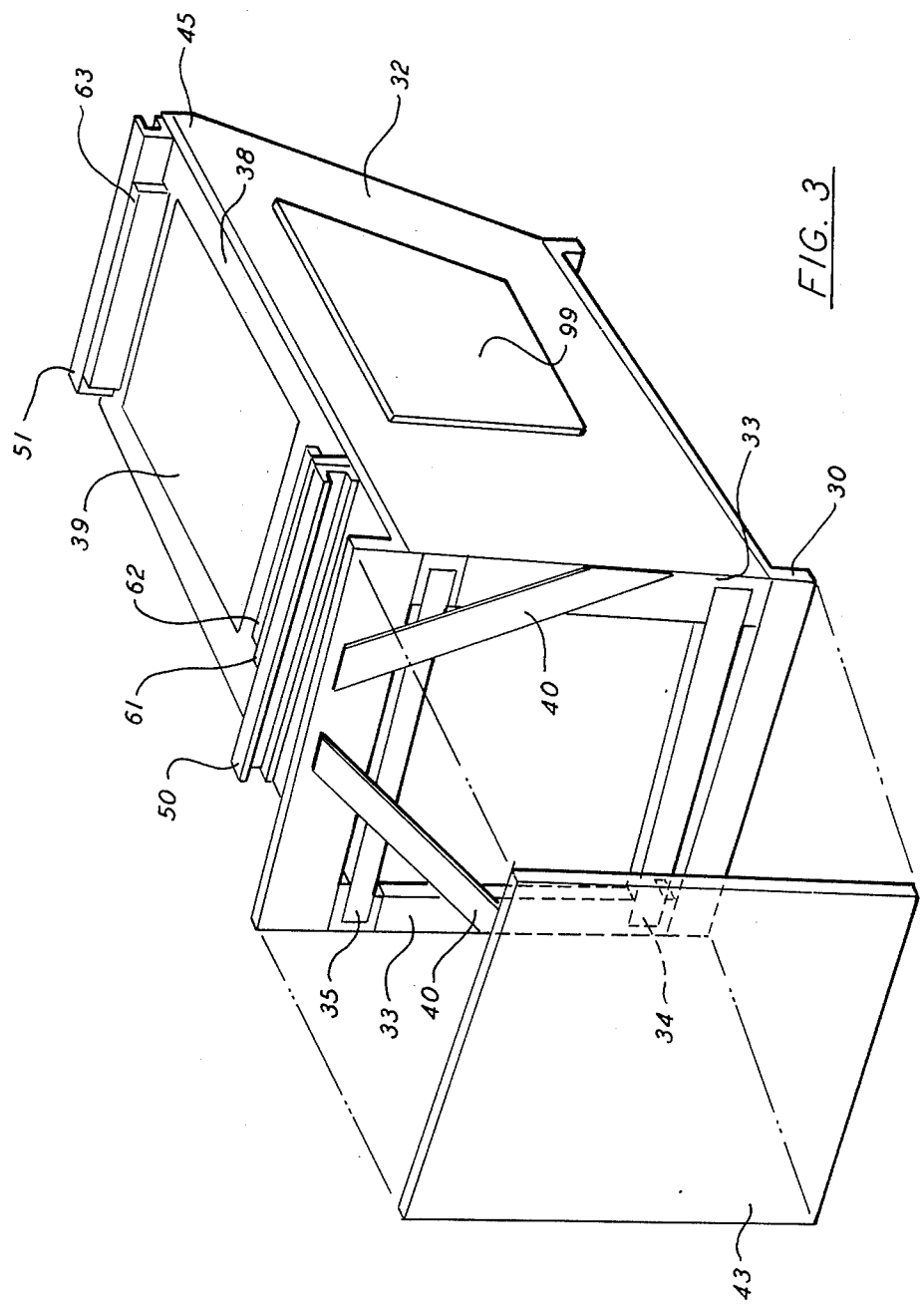
FIG. 3 is a perspective representation of a viewing head.

FIG. 3 is a perspective representation of a viewing head. Reference character 30 represents a channel iron which forms the base of the viewing head. Side panel 32 and columns 33 are fastened to channel 30. Beams 34 and 35 are attached to columns 33 so that columns 33 will be able to support a heavier load. Top panel 38 is attached to columns 33, beam 35 and side 32. Side panel cover 99 is attached to side 32. A rectangular hole 39 is cut in panel 38 so that the picture appearing on the screen of the CRT 13 may be directed inside the viewing head. Channel 50 is attached to top panel 38, and spherical mirror upper retainer 61 and CRT retainer 62 are attached to channel 50. Channel 51 is attached to top plate 38, and CRT retainer 63 is attached to channel 51. The manner in which channels 50 and 51, spherical mirror upper retainer 61 and CRT retainers 62 and 63 hold the spherical mirror (which is contained within the viewing head) are shown in FIG. 4.

The connection of struts 40 to columns 30 and top panel 38 act as diagonal braces and insure that the viewing head will not be deformed when CRT 13 is correctly positioned on panel 38. Back panel 43 is connected to channel 30, columns 33 and top panel 38. Front panel 45 is attached to top panel 38 and side panels 32. The front surface of beamsplitter 12 is exposed; the side surface of beamsplitter 12 will be held against side panels 32; and the top surface of beamsplitter 12 will be connected to front panel 45.

An assembled viewing head is an enclosed box whose front surface is the face of beamsplitter 12. Thus, the back surface of the beamsplitter, spherical mirror and CRT (shown in FIG. 4) will be contained within a box and not exposed to as much dust and dirt as they would be if left in an open environment. Therefore, the optical equipment contained within the viewing head will not have to be cleaned as often.

Figure 4:
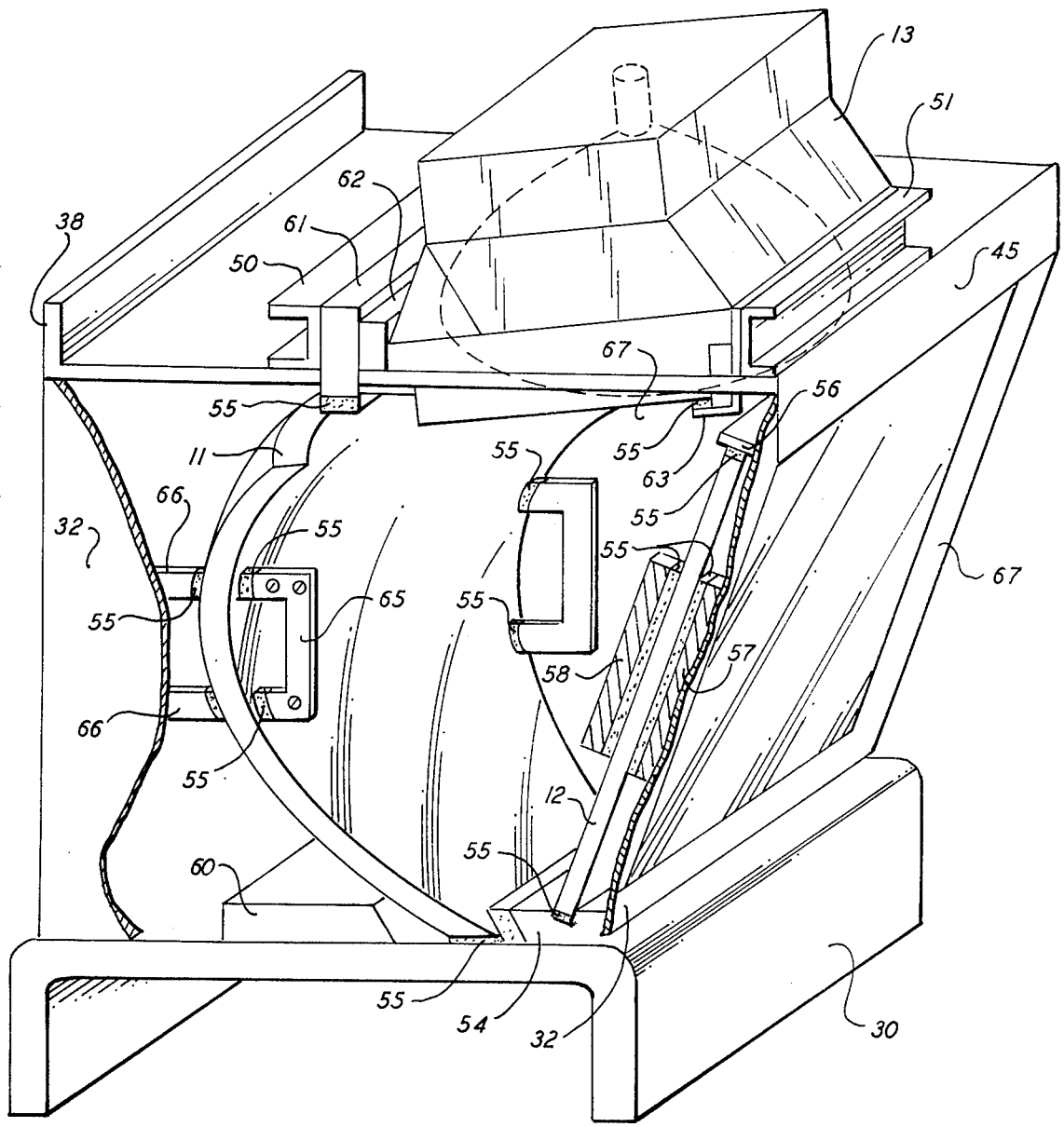
FIG. 4 is a perspective representation in section of a viewing head.

FIG. 4 is a perspective representation partially in section showing the arrangement of spherical mirror 11, beamsplitter 12 and CRT 13 within the viewing head. Side panel 32 is attached to channel iron 30 and top panel 38 is attached to side panels 32 and front plate 45. Thin pieces of cork 55 that will act as cushions are cemented to those surfaces of the spherical mirror 11, beamsplitter 12, and CRT 13 which will be in contact with the various types of hardware that will be used to hold the spherical mirror, beamsplitter and CRT in place.

The bottom end of beamsplitter 12 is placed in the wedge-shaped groove that is cut in lower beamsplitter retainer 54, which is bolted to channel iron 30. Beamsplitter upper retainer 56 is connected to front panel 45 and holds the top edge of beamsplitter 12 in place. The front surface of beamsplitter 12 is flush with beamsplitter locating bar 58 which is bolted to panel 32. Beamsplitter retaining bar 57 is pushed against beamsplitter 12 and retaining bar 57 is bolted to panel 32. To prevent beamsplitter 12 from moving in a horizontal direction, another beamsplitter locating bar and beamsplitter retaining bar are connected to beamsplitter 12 and panel 67. Side panel 67 is opposite panel 32, and a side panel cover 99 is also attached to panel 67. Side panel 67 is connected to channel 30 and top plate 38.

The back side of retainer 54 is beveled so that the bottom front surface of spherical mirror 11 can be pushed against retainer 54. Spherical mirror lower retainer 60 is beveled so that it may be placed against the back surface of spherical mirror 11 and connected to channel 30 to hold the bottom of the mirror 11 against retainer 54. The top end of spherical mirror 11 is held in place by spherical mirror upper retainer 61, retainer 61 being bolted to channel 50. Spherical mirror 11 is flush with cork 55 and spherical mirror locating bar 65, bar 65 being connected to panel 32. Spherical mirror retaining bar 66 is pushed against mirror 11 and bar 66 is connected to panel 32. To prevent mirror 11 from moving in a horizontal direction, another spherical mirror locating bar is connected to panel 67 and another spherical mirror retaining bar is connected to mirror 11 and panel 67.

CRT retainer 62 is bolted to spherical mirror retainer 61 and CRT retainer 63 is bolted to channel 51 so that CRT 13 may be placed in hole 39 and held at the correct angle of inclination.

The connection of the spherical mirror, beamsplitter and CRT to the viewing head will result in the aforementioned equipment being in perfect optical alignment. The reason for this is that the viewing head is designed and manufactured for the particular spherical mirror, beamsplitter and CRT that it will contain. All parts of the viewing head are precisely manufactured so that when the optical equipment is assembled in the viewing head, the optical equipment will be correctly positioned and it will not be necessary to undergo and expensive, time-consuming alignment procedure.

Even though the viewing head protects the optical equipment from the dust and dirt contained in a normal room, it will occasionally be necessary to clean the optical equipment. This may be accomplished by removing side panel covers 99 and exposing the inside of the viewing head so that the optical equipment contained therein and the inside of the viewing head may be cleaned without disturbing the alignment of the optical equipment.

Furthermore, the viewing head may be moved intact to a new location by placing the viewing head in a shipping crate. Once the viewing head arrives at its new location, it will not be necessary to align the optical equipment contained therein since it is already in optical alignment. Thus, once the optical devices are correctly positioned in side the viewing head, it will not ordinarily be necessary to undergo a time-consuming alignment procedure.

The above specification has described a new and improved apparatus for the protection and alignment of the optical equipment. It is realized that the above description may indicate to those skilled in the art additional ways in which this invention may be used without departing from its spirit. It is, therefore, intended that this invention be limited only by the scope of the appended claims.

What is claimed is:

1. An improved display system and viewing head of the type which has a spherical mirror of radius r, a beamsplitter positioned between an observer and the center of said spherical mirror at approximately a 45° angle and an image projecting device located at a distance $r/2$ above said beamsplitter contained in a machined housing wherein the improvement comprises: a premachined base to accept a portion of said spherical mirror and said beamsplitter; means for mounting said spherical mirror to a predetermined location on said base; means for fastening said beamsplitter to a predetermined location on said base so that said beamsplitter will be positioned at approximately a 45° angle from the center of said spherical mirror; a first premachined side panel which is connected to said base; a second premachined side panel which is connected to said base; means for connecting the side edges of said spherical mirror to said first and second side panels; means for holding at predetermined locations the edges of said beamsplitter against said first and second panels; a premachined top panel having a hole, said top panel being able to accept a portion of said spherical mirror and said beamsplitter while being connected to said first and second side panels; means for attaching at predetermined locations said spherical mirror and said beamsplitter to said top panel and means for placing the screen of said device through said hole so that said device will be a distance of $r/2$ above said beamsplitter, whereby said beamsplitter, said spherical mirror and said image projecting device will be in optical alignment upon the assembly of said system, and an observer positioned in front of said beamsplitter will believe that the image appearing on the screen of said image projecting device is realistic and is coming from infinity.

2. The system defined in claim 1 wherein said means for placing comprises: a multiplicity of members which are attached to said top panel in close proximity to said hole; and a multiplicity of angle irons, one side of every said angle iron being connected to one of said members at different vertical distances above said members so that when said device is placed in said hole and attached to said angle irons said device will be at a distance of $r/2$ above said beamsplitter and held at the correct angle of inclination.

3. The system defined in claim 1 wherein said means for connecting comprises: a first locating bar that is connected to said first side panel at a predetermined location to correctly position one of the sides of said spherical mirror; a second locating bar that is connected to said second panel at a predetermined location to correctly position one of the sides of said spherical mirror; a first retaining bar connected to said first panel that pushes against and holds one of the side edges of said spherical mirror against said first locating bar; and a second retaining bar connected to said second panel that pushes against the holds one of the side edges of said spherical mirror against said second locating bar.

4. The system defined in claim 1 wherein said means for holding comprises: a first positioning bar that is connected to said first side panel at a predetermined position to correctly locate one of the sides of said beamsplitter; a second positioning bar that is connected to said second side panel at a predetermined position to correctly locate one of the sides of said beamsplitter; a first holding bar connected to said first panel that pushes against and restrains one of the side edges of said beamsplitter against said first positioning bar; and a second holding bar connected to said second panel that pushes against and restrains one of the side edges of said beamsplitter against said second positioning bar.

5. The system defined in claim 1 wherein said means for fastening comprises a block having a wedge-shaped groove cut in its top surface, said block being bolted to said base so that the bottom end of said beamsplitter may be held in said groove.

6. The system defined in claim 1 wherein said means for mounting comprises: a first slab of material mounted to said base to support the bottom front edge of said spherical mirror; and a second slab of material mounted to said base to hold the bottom back edge of said spherical mirror.

7. The system defined in claim 1 further including a back panel that is connected to said first panel, said second panel, said top panel and said base to prevent dust from entering through the back of said system.

8. A display device which includes a spherical mirror, a beamsplitter and a cathode ray tube which comprises: a machined enclosure that contains means for connecting a beamsplitter to said enclosure; means for connecting a spherical mirror of radius $r$ to said enclosure so that said beamsplitter will be at approximately a 45° angle from th center of said spherical mirror and means for connecting a cathode ray tube to said enclosure at a distance of $r/2$ above said beamsplitter; whereby the connection of said beamsplitter, said spherical mirror and said cathode ray tube to said enclosure will result in said spherical mirror, said beamsplitter and said cathode ray tube being in optical alignment.

9. The device described in claim 8 wherein said accurately machined enclosure comprises: a bottom member; a first side panel connected to said bottom member; a second side panel connected to said bottom member; and a top panel connected to said first side panel and said second side panel.

10. The device described in claim 9 further including a back panel connected to said bottom member, said first side panel, said second side panel and said top panel.

* * * * *